US012398659B2

(12) United States Patent
Dennis et al.

(10) Patent No.: US 12,398,659 B2
(45) Date of Patent: Aug. 26, 2025

(54) INTEGRAL MOTOR PUMP OR TURBINE WITH SENSORLESS MONITORING OF AXIAL BEARING WEAR

(71) Applicant: Flowserve Pte. Ltd., Singapore (SG)

(72) Inventors: Zachary Dennis, Emmaus, PA (US); Joseph Pitino, Greentown, PA (US); Sean A. Cain, Tulsa, OK (US)

(73) Assignee: Flowserve Pte. Ltd., Singapore (SG)

( * ) Notice: Subject to any disclaimer, the term of this patent is extended or adjusted under 35 U.S.C. 154(b) by 134 days.

(21) Appl. No.: 18/402,865

(22) Filed: Jan. 3, 2024

(65) Prior Publication Data

US 2025/0215809 A1 Jul. 3, 2025

(51) Int. Cl.
*F01D 25/16* (2006.01)
*F04D 29/058* (2006.01)

(52) U.S. Cl.
CPC ........... *F01D 25/16* (2013.01); *F04D 29/058* (2013.01); *F05D 2220/30* (2013.01); *F05D 2240/51* (2013.01); *F05D 2240/52* (2013.01); *F05D 2260/80* (2013.01)

(58) Field of Classification Search
CPC .... F01D 25/16; F04D 29/058; F05D 2220/30; F05D 2240/51; F05D 2240/52; F05D 2260/80
USPC ........................................................ 417/423.7
See application file for complete search history.

(56) References Cited

U.S. PATENT DOCUMENTS 1,632,357 A 6/1927 White
1,949,796 A 3/1934 Himmel
2,438,629 A 3/1948 Anderson
2,440,947 A 5/1948 Hart
2,752,857 A 7/1956 White
2,824,520 A 2/1958 Bartels
2,855,141 A 10/1958 Van Rijn
(Continued)

FOREIGN PATENT DOCUMENTS

EP 2626573 A1 8/2013
WO 9908366 A1 2/1999
WO 2010081123 A1 7/2010

OTHER PUBLICATIONS

Office action for U.S. Appl. No. 18/437,855, mail date Dec. 4, 2024, 28 pages.

(Continued)

*Primary Examiner* — Jorge L Leon, Jr.
(74) *Attorney, Agent, or Firm* — Maine Cernota & Curran

(57) ABSTRACT

Axial bearing wear of a directly driven, axial, integral motor pump (IMP) or integral motor turbine (IMT) is monitored without use of sensors by estimating an axial rotor-stator gap according to a known dependence of the back EMF on the impeller rotation rate and the rotor-stator gap. The back EMF can be directly measured, for example between impulses of a variable frequency drive (VFD), or inferred from measurements of voltage applied to IMP stator coils and the resulting current. The rotation rate of an IMT impeller can be determined from a modulation frequency of the EMF. The rotation rate of an IMP impeller can be inferred due to its synchronicity with the applied, amplitude modulated power. A controller can record and report rotor-stator gap estimates over time, and can halt operation of the module if the estimated rotor-stator gap falls outside of a specified range.

20 Claims, 8 Drawing Sheets

(56) References Cited

U.S. PATENT DOCUMENTS

| | | | | |
|---|---|---|---|---|
| 2,968,249 | A | 1/1961 | Caine | |
| 3,102,679 | A | 9/1963 | Rudy | |
| 3,135,212 | A | 6/1964 | Todd | |
| 3,364,866 | A | 1/1968 | Sato | |
| 3,868,196 | A | 2/1975 | Lown | |
| 4,213,745 | A | 7/1980 | Roberts | |
| 4,508,998 | A | 4/1985 | Hahn | |
| 4,806,080 | A | 2/1989 | Mizobuchi | |
| 5,117,141 | A | 5/1992 | Hawsey | |
| 5,158,440 | A | 10/1992 | Cooper | |
| 5,269,664 | A | 12/1993 | Buse | |
| 5,332,374 | A | 7/1994 | Kricker | |
| 5,494,418 | A | 2/1996 | Moriya | |
| 5,567,133 | A | 10/1996 | Kobaybashi | |
| 5,697,767 | A | 12/1997 | Bissell | |
| 5,713,727 | A | 2/1998 | Veronesi et al. | |
| 6,012,909 | A | 1/2000 | Sloteman | |
| 6,034,465 | A | 3/2000 | Mckee | |
| 6,056,518 | A | 5/2000 | Allen | |
| 6,135,098 | A | 10/2000 | Allen | |
| 6,175,173 | B1 | 1/2001 | Stephan | |
| 6,422,838 | B1 | 7/2002 | Sloteman | |
| 6,835,051 | B2 | 12/2004 | Heim | |
| 7,067,950 | B2 | 6/2006 | Hirzel | |
| 8,146,358 | B2 * | 4/2012 | Greentree | F01D 25/16 384/624 |
| 8,303,268 | B2 | 11/2012 | Werson | |
| 11,323,003 | B2 | 5/2022 | Judge | |
| 2002/0035974 | A1 | 3/2002 | Pawellek | |
| 2002/0106290 | A1 | 8/2002 | Bader | |
| 2003/0021683 | A1 | 1/2003 | Capone | |
| 2004/0013547 | A1 | 1/2004 | Allen | |
| 2005/0196269 | A1 | 9/2005 | Racer | |
| 2007/0048158 | A1 | 3/2007 | Kochan, Jr. | |
| 2008/0288115 | A1 | 11/2008 | Rusnak | |
| 2009/0208349 | A1 | 8/2009 | Eller | |
| 2011/0164995 | A1 | 7/2011 | Genster | |
| 2011/0238172 | A1 | 9/2011 | Akdis | |
| 2011/0318175 | A1 | 12/2011 | Converse | |
| 2013/0028760 | A1 | 1/2013 | Lin | |
| 2013/0108488 | A1 * | 5/2013 | Chien | F04D 29/22 417/423.7 |
| 2013/0213325 | A1 | 8/2013 | Kim | |
| 2013/0236341 | A1 | 9/2013 | Anderson | |
| 2015/0104335 | A1 | 4/2015 | Faller | |
| 2016/0006379 | A1 | 1/2016 | Wang et al. | |
| 2016/0061210 | A1 * | 3/2016 | Hasegawa | F04D 29/041 415/104 |
| 2016/0072362 | A1 | 3/2016 | Kube | |
| 2016/0305447 | A1 | 10/2016 | Dreiss et al. | |
| 2018/0306672 | A1 * | 10/2018 | Pattom | F04D 13/04 |
| 2019/0120249 | A1 | 4/2019 | Judge | |
| 2019/0145428 | A1 | 5/2019 | Judge et al. | |
| 2020/0067376 | A1 | 2/2020 | Judge | |
| 2023/0081667 | A1 | 3/2023 | Alcad | |

OTHER PUBLICATIONS

PCT International Search Report & Written Opinion for Appl No. PCT/US2018/060690 dtd Mar. 12, 2019, 17 pages.

Office Action for U.S. Appl. No. 16/204,997 dated Jul. 2, 2020, 6 Pages.

Office Action for U.S. Appl. No. 16/668,665, dated Dec. 4, 2020, 6 Pages.

Office Action for U.S. Appl. No. 16/668,665, dated Jan. 15, 2021, 50 Pages.

International Search Report and Written Opinion for PCT Appl. No. PCT/US2020/056972, mail date Feb. 17, 2021, 11 Pages.

Office Action for U.S. Appl. No. 16/668,665, dated May 3, 2021, 27 Pages.

Advisory Action for U.S. Appl. No. 16/668,665 mail date Jul. 14, 2021, 5 pages.

Notice of Allowance for U.S. Appl. No. 16/668,665 mail date Feb. 22, 2022, 17 Pages.

International Preliminary Report on Patentability for PCT Appl. No. PCT/US2020/056972 Mail Date May 12, 2022, 8 pages.

Office Action for India Appl. No. 202217025766, dated Aug. 18, 2022, 7 Pages.

Extended European Search Report of EP Appl No. 20882691.7, mail date Nov. 11, 2022, 8 pages.

Office Action for JP application No. 2022-524573 mail date Jul. 18, 2023, 6 pages.

Sloteman, Donald P., Piercy, mark, "Developing Sealless Integral Motor Pumps Using Axial Field Permanent Magnet", Disk Motors. IMP White Paper, 17th Pumps Symposium (2000), 16 pages.

* cited by examiner

INTEGRAL MOTOR PUMP OR TURBINE WITH SENSORLESS MONITORING OF AXIAL BEARING WEAR

RELATED APPLICATIONS

This application is related to U.S. Pat. No. 11,323,003, issued on May 3, 2022, which is herein incorporated by reference in its entirety for all purposes.

FIELD OF THE INVENTION

The invention relates to pumps and turbines, and more particularly, to integral motor pumps and integral motor turbines.

BACKGROUND OF THE INVENTION

Integral motor pumps (IMPs) and integral motor turbines (IMTs), which are sometimes referred to as "sealless" pumps and turbines, are centrifugal devices that combine a rotating hydraulic component, such as an impeller, turbine, fan, or compressor (referred to generically herein as an "impeller") with a motor or generator into an integrated apparatus within a common housing. In many instances, with reference to FIGS. 1A and 1B, the impeller is fixed to a rotatable shaft 104, and the motor or generator comprises an armature 102 that is also fixed to the shaft 104, and is surrounded by a stator 100 that is fixed to the housing 106. Bearings 114 within the apparatus provide stability to the shaft 104, and can be lubricated by a dedicated, sealed lubricant reservoir, or by the process fluid that is flowing through the apparatus.

For simplicity, the present disclosure sometimes refers specifically to pumps that include motors. However, it will be understood that the disclosure presented herein applies equally to turbines that include generators, and that references herein to IMPs and other pumps refer generically to pumps (IMPs) and turbines (IMTs), as well as to fans and compressors, while references to motors refer generically to motors and generators or alternators, unless otherwise stated or required by context.

The bearings in an IMP or IMT are subject to wear over time, especially when they are product lubricated, and can eventually fail if not maintained in a timely manner. Accordingly, it is frequently desirable to monitor the bearing wear of an IMP or IMT over time, so that maintenance can be applied soon enough to avoid more extensive damage and unplanned repairs. Indeed, the American Petroleum Institute standard API 685 requires pump designers to include features in IMPs and IMTs that monitor and report the bearing wear status.

In IMPs and IMTs such as FIGS. 1A and 1B that include a separate motor connected to an impeller by a rotating shaft, the bearings are required to provide both radial and axial stability to the shaft, due to the axial hydraulic thrust of the impeller as well as radial forces due to gravity and due to shaft vibrations. As a result, the bearings are subject to both radial and axial wear. With continuing reference to FIGS. 1A and 1B, API 685 is typically satisfied by including proximity sensors 108 within the pump or turbine that monitor radial clearances between the shaft 104 and surrounding structures, as well as sensors 110 that measure axial displacements of the shaft 104. FIGS. 1A and 1B illustrate sensing of axial displacement of the shaft 104 in two opposing directions.

Unfortunately, these additional sensors and associated elements add significant cost and complexity to the pump or turbine apparatus, and also add additional failure modes to the pump or turbine, in that the sensors themselves can fail, and thereby give rise to additional maintenance requirements.

Rather than configuring an armature 102 and stator 100 as illustrated in FIGS. 1A, and 1B, another "directly driven" approach is to attach induction coils or permanent magnets directly to the impeller of an IMP or IMT, and arrange the induction coils or permanent magnets such that they are proximally aligned with coils provided in the stator, such that the stator is able to impart torque directly to the impeller, rather than imparting torque to a shaft and thereby indirectly imparting torque to the impeller. In some applications, the shaft is firmly anchored to the housing, while only the impeller, induction coils or permanent magnets, and bearing rotate. Examples of this direct drive approach are presented in U.S. Pat. No. 11,323,003, also by the present applicant, which is herein incorporated by reference in its entirety for all purposes.

This "direct drive" approach can significantly reduce the length of the shaft, thereby reducing the radial wear on the bearings due to shaft vibrations. However, the direct drive approach does not significantly reduce axial bearing wear. Indeed, the magnetic attraction between the stator coils and the induction coils or permanent magnets opposes the hydraulic thrust of the impeller, so that the net axial thrust can shift from one direction to the other depending on the rotor speed.

What is needed, therefore, is an apparatus and method for monitoring the axial bearing wear of a directly driven integral motor-pump (IMP) or integral motor-turbine (IMT) without adding additional cost, complexity, or failure modes to the IMP or IMT.

SUMMARY OF THE INVENTION

The present invention is an apparatus and method for monitoring the axial bearing wear of a directly driven integral motor-pump (IMP) or integral motor-turbine (IMT) without adding additional cost, complexity, or failure modes to the IMP or IMT. For simplicity, the following disclosure sometimes refers specifically to pumps and pumping systems. However, it will be understood that the disclosure presented herein applies equally to pumps and turbines, and that references herein to IMPs and other pumps refer generically to both pumps and turbines, while references to motors refer generically to motors and generators or alternators, unless otherwise stated or required by context.

The disclosed pumping system comprises an IMP or IMT module that is similar to the "sealless" IMP modules disclosed by U.S. Pat. No. 11,323,003, also by the present applicant, which is herein incorporated by reference in its entirety for all purposes. The "rotor," i.e. the assembly of rotating components, in the IMP or IMT module comprises an impeller, and a plurality of induction coils or permanent magnets cooperative with the impeller. The IMP or IMT module further includes a stator housing containing stator coils that are positioned in axial opposition to the induction coils or permanent magnets.

For IMP embodiments, the stator coils are energized by a power source that is actuated by a controller, and the induction coils or permanent magnets and stator coils function cooperatively together as a synchronous motor that applies rotational torque directly to the impeller. In some embodiments, the power source is a variable frequency drive (VFD), which enables the impeller rotation rate to be variable, in that the electrical impulses that are emitted by the VFD are variable in frequency, and the impeller rotation is synchronous with the VFD impulse frequency.

For IMT embodiments, the stator coils are energized by the permanent magnets as driven by the impeller, and the permanent magnets and stator coils function cooperatively together as an electrical generator or alternator.

In addition to the impeller and the induction coils or permanent magnets, the rotor includes a bearing that is configured to allow the rotor to rotate about a fixed, non-rotating shaft. The bearing includes a radial support portion that radially supports the rotor, and an axial support portion that acts as a thrust limiter by limiting axial movements of the rotor. In various embodiments, the bearing is product lubricated. As noted above, according to the direct drive approach the shaft can be firmly anchored to the housing, and need be only slightly longer than the bearing, thereby significantly reducing radial displacements (radial vibrations) and tilting of the impeller. For this reason, radial bearing wear can be neglected in comparison to the axial bearing wear that results from the axial hydraulic thrust of the impeller and the magnetic thrust resulting from magnetic attraction between the induction coils or permanent magnets and stator coils.

Due to the axial alignment of the induction coils or permanent magnets and stator coils, axial wear of the bearing due to magnetic thrust reduces the axial "rotor-stator gap" between the induction coils or permanent magnets and stator coils, and thereby alters the electromechanical properties of the motor or generator. In particular, the magnitude of the EMF (electro-motive force) that is generated within the stator coils by the induction coils or permanent magnets due to rotation of the impeller is directly dependent upon the impeller rotation rate and the size of the rotor-stator gap. For IMP embodiments, this "back" EMF opposes the drive EMF applied by the power source. For simplicity, the EMF in the stator coils that is induced by the induction coils or permanent magnets is referred to herein generically as the "back" EMF, both with reference to IMPs and to IMTs.

The present invention estimates the progressive axial bearing wear by monitoring the rotation rate of the impeller and directly or indirectly monitoring the magnitude of the back EMF, and by estimating changes in the magnitude of the axial rotor-stator gap based on measured changes in the proportionality of the back EMF to the rotation rate.

In some IMP embodiments, because the induction coils or permanent magnets and stator coils function as a synchronous motor, the rotation rate of the rotor is known from the line frequency of the power source, or from the impulse frequency of the power source output if the power source is a VFD. In IMT embodiments, the rotation rate of the rotor can be determined based on the periodic amplitude modulation of the output voltage of the generator.

In some IMP embodiments, the back EMF is indirectly determined by monitoring the voltage and current that are applied to the stator coils. This approach takes advantage of the fact that the back EMF reduces the net voltage that is applied to the stator coils, which causes the power source to compensate by increasing the applied voltage (sometimes referred to as the "phase voltage") so that the required current in the stator coils is maintained. The back EMF thereby increases an effective complex impedance or "phase inductance" of the stator coils, which can be monitored as a change in the current to voltage ratio of the power source output.

In various IMP embodiments where the power source is a source of intermittent or pulsed power, such as a VFD, the back EMF is directly measured during the intervals between the electrical impulses as a voltage that is generated within the stator coils by the induction coils or permanent magnets. In IMT embodiments, the output of the generator is the "back" EMF, and is directly monitored.

In embodiments, the functional relationship between the back EMF and the axial rotor-stator gap is determined based on calibration measurements, which can include data collected during normal IMP or IMT operation, component testing, and/or measurements of the stator EMF during "free" rotation of the impeller, i.e. rotation of the impeller that is externally driven while the stator is unloaded by the power source or generator.

In embodiments, the disclosed method of monitoring axial bearing wear therefore does not require addition of any sensors to the IMP or IMT, but instead depends entirely on external measurements of voltages and/or currents, in combination with a knowledge of the impeller rotation rate. In various embodiments, it is only necessary to modify the configuration of the controller so that it that will determine the rotation rate of the rotor and the back EMF, calculate the implied axial rotor-stator gap, and take further actions as needed.

In various embodiments, the controller reports the axial wear status of the bearing as a visual indication and/or a log entry that can be periodically reviewed as needed. In some embodiments, the controller is configured to issue an alarm if extreme wear is detected, such as issuing an audible alert or highly visible indication, and/or transmitting a message to a user by email and/or text (SMS) message. In various embodiments, the controller is configured to automatically halt the operation of the IMP or IMT module if the estimated magnitude of the axial rotor-stator gap falls outside of a specified range.

One general aspect of the present invention is a pump system or turbine system comprising an integral motor pump module (IMP) or motor turbine module (IMT) that includes a module housing configured to enable a fluid to pass from an input thereof to an output thereof, a stator housing contained within and fixed to the module housing, a shaft extending axially and proximally from the stator housing, an impeller, a bearing fixed to the impeller and configured to enable the impeller to rotate about the shaft, a plurality of induction coils or permanent magnets fixed to a distal face of the impeller and configured to pass in proximity to a proximal face of the stator housing when the impeller rotates about the shaft, a plurality of stator coils contained within the stator housing and configured to be proximate the induction coils or permanent magnets as they pass in proximity to the proximal face of the stator housing.

The induction coils or permanent magnets and stator coils are axially separated by a rotor-stator gap as the induction coils or permanent magnets pass in proximity to the proximal face of the stator housing, and thereby in proximity to the stator coils. A magnetic thrust limiter is fixed to the stator housing and configured to resist a distally axial magnetic thrust of the impeller induction coils or permanent magnets toward the stator coils by applying an opposing mechanical force to the bearing, the magnetic thrust limiter thereby maintaining and defining the rotor-stator gap when the magnetic thrust is greater than a hydraulic thrust of the impeller. The pump system or turbo system further includes a power source or power load electrically cooperative with the stator coils, and a controller configured to determine a magnitude of a back EMF generated by the passage of the induction coils or permanent magnets in proximity to the stator coils, determine a rotation rate of the impeller, estimate a magnitude of the rotor-stator gap according to a specified relationship between the rotor-stator gap, the rotation rate of the impeller, and the magnitude of the back EMF, and estimate a wear status of the magnetic thrust limiter according to the estimated magnitude of the rotor-stator gap when the magnetic thrust is greater than the hydraulic thrust.

In embodiments, the shaft is fixed to the stator housing.

In any of the above embodiments, the thrust limiter can resist the distally axial magnetic thrust of the impeller by physically contacting the bearing.

In any of the above embodiments, determining the magnitude of the back EMF can includes directly measuring the back EMF. In some of these embodiments where the IMP or IMT module is an IMP module and the power source is a variable frequency drive (VFD), the back EMF is directly measured during intervals between power impulses emitted by the VFD.

In any of the above embodiments, the IMP or IMT module can be an IMP module, and determining the magnitude of the back EMF can include calculating the back EMF according to a voltage applied to the stator coils by the power source and a current flowing through the stator coils.

In any of the above embodiments where the IMP or IMT module is an IMT module, determining the rotation rate of the impeller can include directly measuring the back EMF and determining a periodicity of an amplitude modulation of the back EMF.

In any of the above embodiments where the IMP or IMT module is an IMP module, and the rotation of the impeller is synchronous with an amplitude modulation of a voltage applied to the stator coils by the power source, determining the rotation rate of the impeller can include deducing the rotation rate of the impeller from a modulation frequency of the amplitude modulation of the voltage applied to the stator coils by the power source.

Any of the above embodiments can further include a hydraulic thrust limiter fixed to the stator housing and configured to resist a proximally axial hydraulic thrust of the impeller by applying an opposing mechanical force to the bearing, the hydraulic thrust limiter thereby maintaining and defining the rotor-stator gap when the hydraulic thrust is greater than the magnetic thrust. In some of these embodiments, the controller is configured to estimate, according to the specified relationship between the rotor-stator gap, the rotation rate of the impeller, and the magnitude of the back EMF, both a minimum magnitude of the rotor-stator gap when the magnetic axial thrust is greater than the hydraulic axial thrust, and a maximum magnitude of the rotor-stator gap when the hydraulic axial thrust is greater than the magnetic axial thrust, estimate the wear status of the magnetic thrust limiter according to the estimated magnitude of the rotor-stator gap when the magnetic thrust is greater than the hydraulic thrust, and estimate a wear status of the hydraulic thrust limiter according to the estimated magnitude of the rotor-stator gap when the hydraulic thrust is greater than the magnetic thrust.

In any of the above embodiments, the controller can be further configured to cause the IMP or IMT module to cease operation if the estimated magnitude of the rotor-stator gap falls below a specified threshold.

A second general aspect of the present invention is a method of monitoring bearing wear of an integral motor pump module (IMP) or integral motor turbine module IMT. The method includes providing an IMP module or an IMT module comprising a module housing configured to enable a fluid to pass from an input thereof to an output thereof, a stator housing contained within and fixed to the module housing, a shaft extending axially and proximally from the stator housing, an impeller, a bearing fixed to the impeller and configured to enable the impeller to rotate about the shaft, a plurality of induction coils or permanent magnets fixed to a distal face of the impeller and configured to pass in proximity to a proximal face of the stator housing when the impeller rotates about the shaft, a plurality of stator coils contained within the stator housing and configured to be proximate the induction coils or permanent magnets as they pass in proximity to the proximal face of the stator housing, the induction coils or permanent magnets and stator coils being axially separated by a rotor-stator gap as the induction coils or permanent magnets pass in proximity to the proximal face of the stator housing, and thereby in proximity to the stator coils, and a thrust limiter fixed to the stator housing and configured to resist a distally axial thrust of the impeller by applying an opposing force to the bearing, the thrust limiter thereby maintaining and defining the rotor-stator gap.

The method further includes determining a magnitude of a back EMF generated by the passage of the induction coils or permanent magnets in proximity to the stator coils, determining a rotation rate of the impeller, estimating a magnitude of the rotor-stator gap according to a specified relationship between the rotor-stator gap, the rotation rate of the impeller, and the magnitude of the back EMF, and estimating a wear status of the hydraulic thrust limiter according to the estimated magnitude of the rotor-stator gap when the hydraulic thrust is greater than the magnetic thrust.

In embodiments, determining the magnitude of the back EMF includes directly measuring the back EMF. In some of these embodiments where the IMP or IMT module is an IMP module and the power source is a variable frequency drive (VFD), determining the magnitude of the back EMF includes directly measuring the magnitude of the back EMF during intervals between power impulses emitted by the VFD.

In any of the above embodiments where the IMP or IMT module is an IMP module, determining the magnitude of the back EMF can include calculating the back EMF according to a voltage applied to the stator coils and a current flowing through the stator coils.

In any of the above embodiments where the IMP or IMT module is an IMT module, determining the rotation rate of the impeller can include directly measuring the back EMF, and determining a periodicity of an amplitude modulation of the back EMF.

In any of the above embodiments where the IMP or IMT module is an IMP module, and the rotation of the impeller is synchronous with an amplitude modulation of a voltage applied to the stator coils, determining the rotation rate of the impeller can include deducing the rotation rate of the impeller from a modulation frequency of the amplitude modulation of the voltage applied to the stator coils.

In any of the above embodiments, the IMP or IMT can further include a hydraulic thrust limiter fixed to the stator housing and configured to resist a proximally axial hydraulic thrust of the impeller by applying an opposing mechanical force to the bearing, the hydraulic thrust limiter thereby maintaining and defining the rotor-stator gap when the hydraulic thrust is greater than the magnetic thrust, and the method can further include estimating the magnitude of the rotor-stator gap when the hydraulic axial thrust is greater than the magnetic axial thrust according to the specified relationship between the rotor-stator gap, the rotation rate of the impeller, and the magnitude of the back EMF, and estimating a wear status of the hydraulic thrust limiter according to the estimated magnitude of the rotor-stator gap when the hydraulic thrust is greater than the magnetic thrust.

In some of these embodiments, communicating the estimated magnitude of the rotor-stator gap to the user includes at least one of visually displaying the estimated magnitude of the rotor-stator gap, transmitting the estimated magnitude of the rotor-stator gap to a device that is accessible to the user, and recording the estimated magnitude of the rotor-stator gap on non-transient media that is accessible to the user.

And in any of the above embodiments, the method can further include causing the IMP or IMT module to cease operation if the estimated magnitude of the rotor-stator gap falls below a specified threshold.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is an apparatus and method for monitoring the bearing wear of a directly driven integral motor-pump (IMP) or integral motor-turbine (IMT) without adding additional cost, complexity, or failure modes to the IMP or IMT. For simplicity, the present disclosure sometimes refers specifically to pumps and pumping systems. However, it will be understood that the disclosure presented herein applies to both pumps and turbines, and that references herein to IMPs and other pumps refer generically to both pumps and turbines, while references to motors refer generically to motors and generators or alternators, unless otherwise stated or required by context.

Figure 1A:
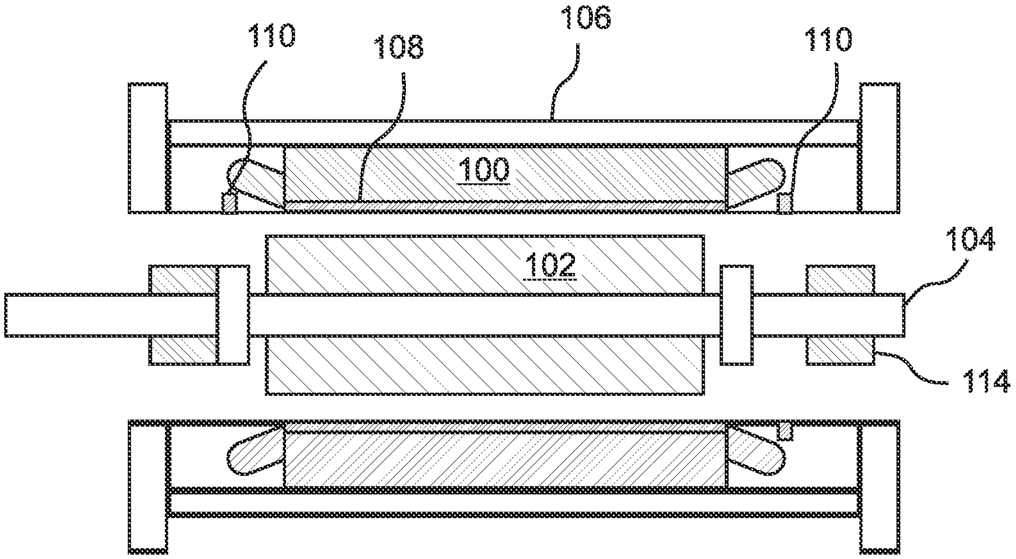
Fig. 1A Prior Art
FIG. 1A illustrates measurement by sensors of radial and axial positioning of a rotor shaft in a first axial position according to the prior art.
Figure 1B:
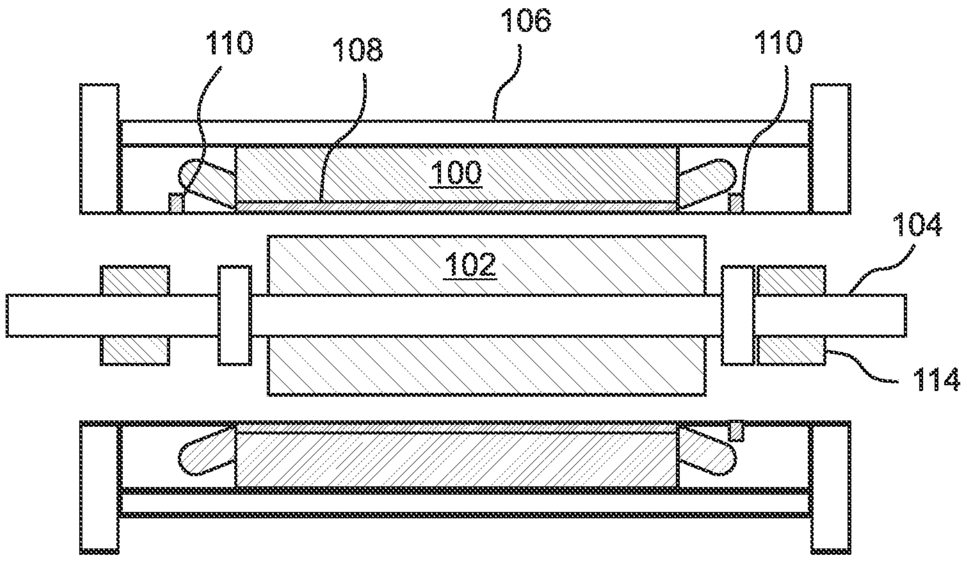
Fig. 1B Prior Art
FIG. 1B illustrates measurement by sensors of radial and axial positioning of a rotor shaft in a second axial position according to the prior art.
Figure 2A:
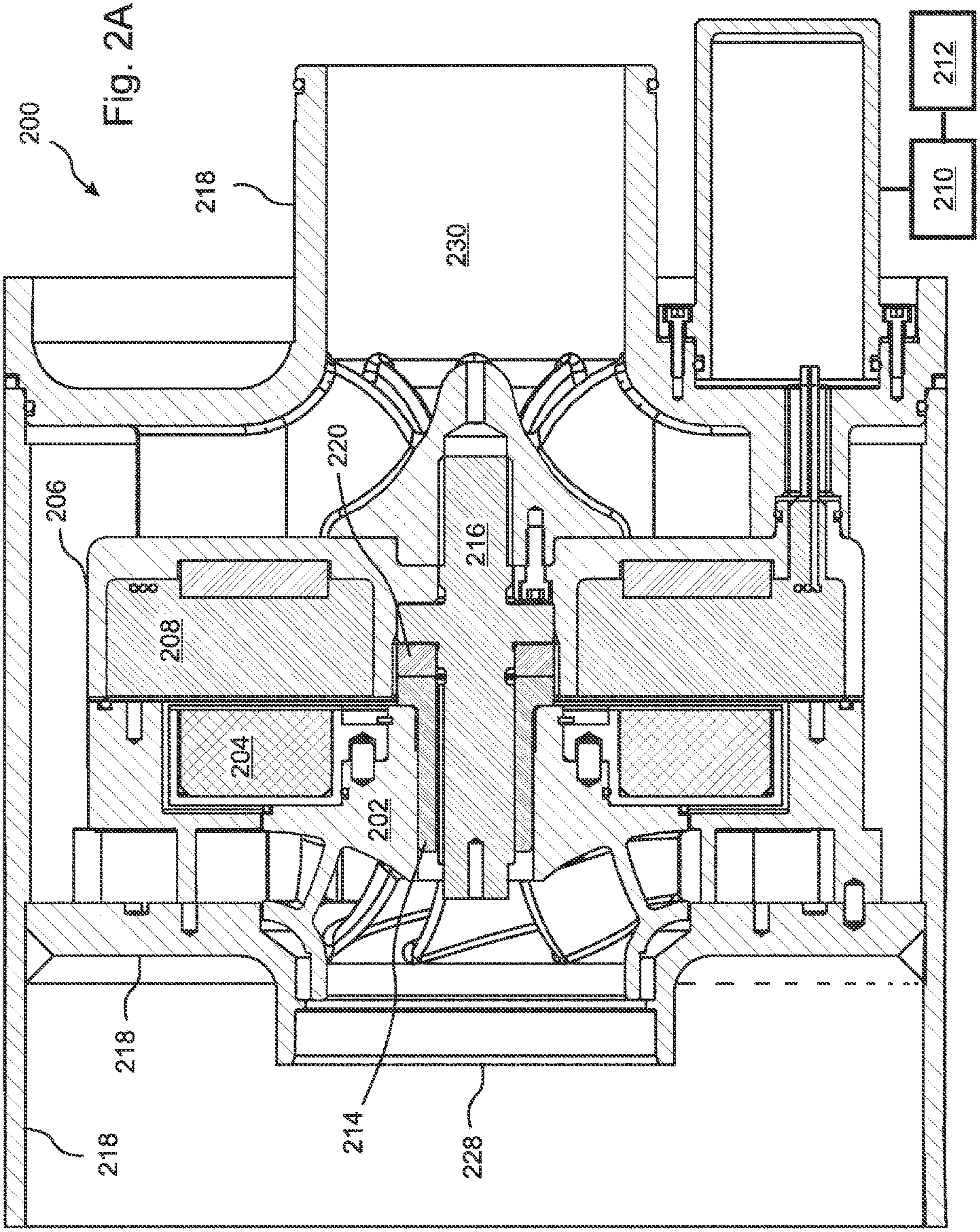
FIG. 2A is a sectional view of an embodiment of the present invention, drawn to scale except for elements 210 and 212.
Figure 2B:
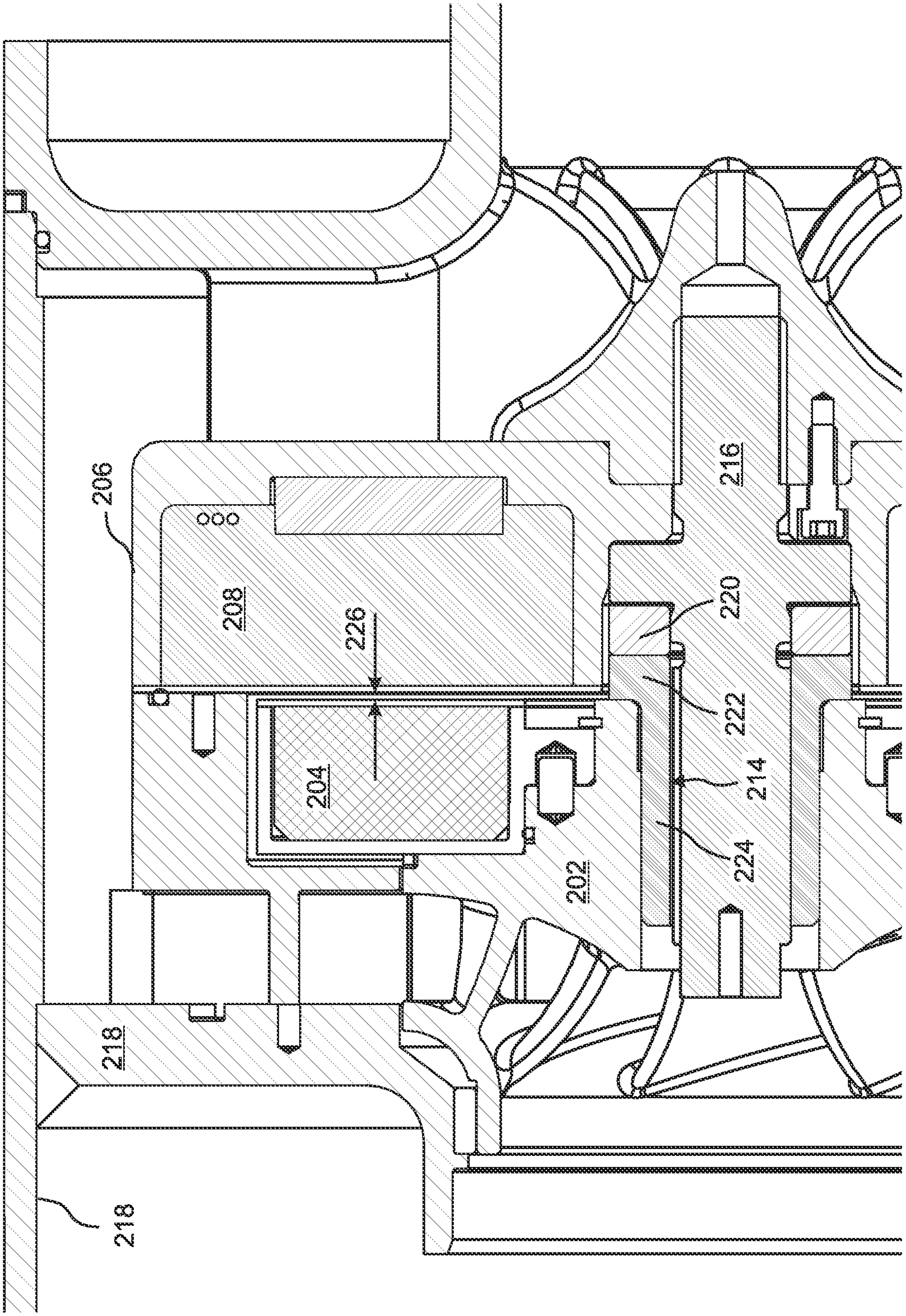
FIG. 2B is an enlarged sectional view, drawn to scale, of a portion of the embodiment of FIG. 2A.

With reference to FIGS. 2A and 2B, the disclosed system comprises an IMP or IMT module 200 that is similar to the "sealless" IMP modules disclosed by U.S. Pat. No. 11,323,003, also by the present applicant, which is herein incorporated by reference in its entirety for all purposes. FIGS. 2A and 2B illustrate an IMP embodiment that is configured to draw a fluid from a module inlet 228 and deliver the fluid to a module outlet 230. According to the illustrated embodiment, the "rotor," i.e. the assembly of rotating components, in the IMP or IMT module 200 comprises an impeller 202 and a plurality of permanent magnets 204 that are cooperative with the impeller 202. The illustrated IMP or IMT module 200 further includes a stator housing 206 containing stator coils 208 that are positioned in axial opposition to the permanent magnets 204. In similar embodiments, inductions coils are used in place of the permanent magnets 204. It will be understood that the term "permanent magnets" is used herein to refer generically to permanent magnets or induction coils, unless otherwise required by context.

For IMP embodiments such as FIGS. 2A and 2B, the stator coils 208 are energized by a power source 210 that is actuated by a controller 212, and the magnets 204 and stator coils 208 function cooperatively together as a synchronous motor that applies rotational torque directly to the impeller 202. In some embodiments, the power source 210 is a variable frequency drive (VFD), which enables the impeller rotation rate to be variable, in that the electrical impulses that are emitted by the VFD 210 are variable in frequency, and the impeller rotation is synchronous with the VFD impulse frequency.

For IMT embodiments, the stator coils 208 are energized by the permanent magnets 204 as driven by the impeller 202, and the magnets 204 and stator coils 208 function cooperatively together as an electrical generator or alternator. The primary difference, as compared to FIGS. 2A and 2B, is that, for an IMT embodiment, the "power source" 210 is replaced by a power load.

In addition to the impeller 202 and the permanent magnets 204, the rotor includes a bearing 214 that includes a radial support portion 224 and an axial support portion 222. The bearing 214 is configured to allow the rotor to rotate about a fixed, non-rotating shaft 216. A thrust washer 220 that is fixed to the stator housing 206 abuts the axial support portion 222 of the bearing 214, and functions as a thrust limiter that limits axial movement of the bearing 214 along the shaft 216 toward the stator housing 206. In the illustrated embodiment, the bearing 214 is product lubricated, and the shaft 216 is firmly anchored to the stator housing 206, which is firmly attached to the module housing 218. The shaft 216 is only slightly longer than the bearing 214, and does not rotate, thereby all but eliminating radial displacements (radial vibration) and tilting of the impeller 202. For this reason, radial bearing wear can be neglected in comparison to the axial bearing wear that results from the axial magnetic attraction between the permanent magnets 204 and the stator coils 208, and from the hydraulic thrust of the impeller 202.

With reference to FIG. 2B, due to the axial alignment of the permanent magnets 204 and stator coils 208, axial wear of the axial support portion 222 of the bearing 214 due to magnetic axial thrust reduces the axial rotor-stator gap 226 between the permanent magnets 204 and stator coils 208, and thereby alters the electromechanical properties of the motor or generator. In particular, with reference to FIG. 3, the back EMF (electro-motive force) 300 that is generated within the stator coils 208 by the permanent magnets 204 due to rotation of the impeller 202 is directly dependent upon the impeller rotation rate and the rotor-stator gap 226. For IMP embodiments such as FIGS. 2A and 2B, this EMF functions as a "back" EMF that opposes the EMF applied by the power source 210. For simplicity, the induced EMF in the stator coils 208 is referred to herein generically as the “back” EMF both with reference to IMPs and to IMTs.

In the present invention, the controller 212 is configured to estimate the progressive axial bearing wear by monitoring the rotation rate of the impeller 202 and the magnitude of the back EMF, and by estimating changes in the magnitude of the axial rotor-stator gap 226 based on measured or inferred changes in the proportionality of the back EMF to the rotation rate, as compared to a pre-calibrated proportionality that applies to the initial, non-worn state of the thrust washer 220.

Figure 3:
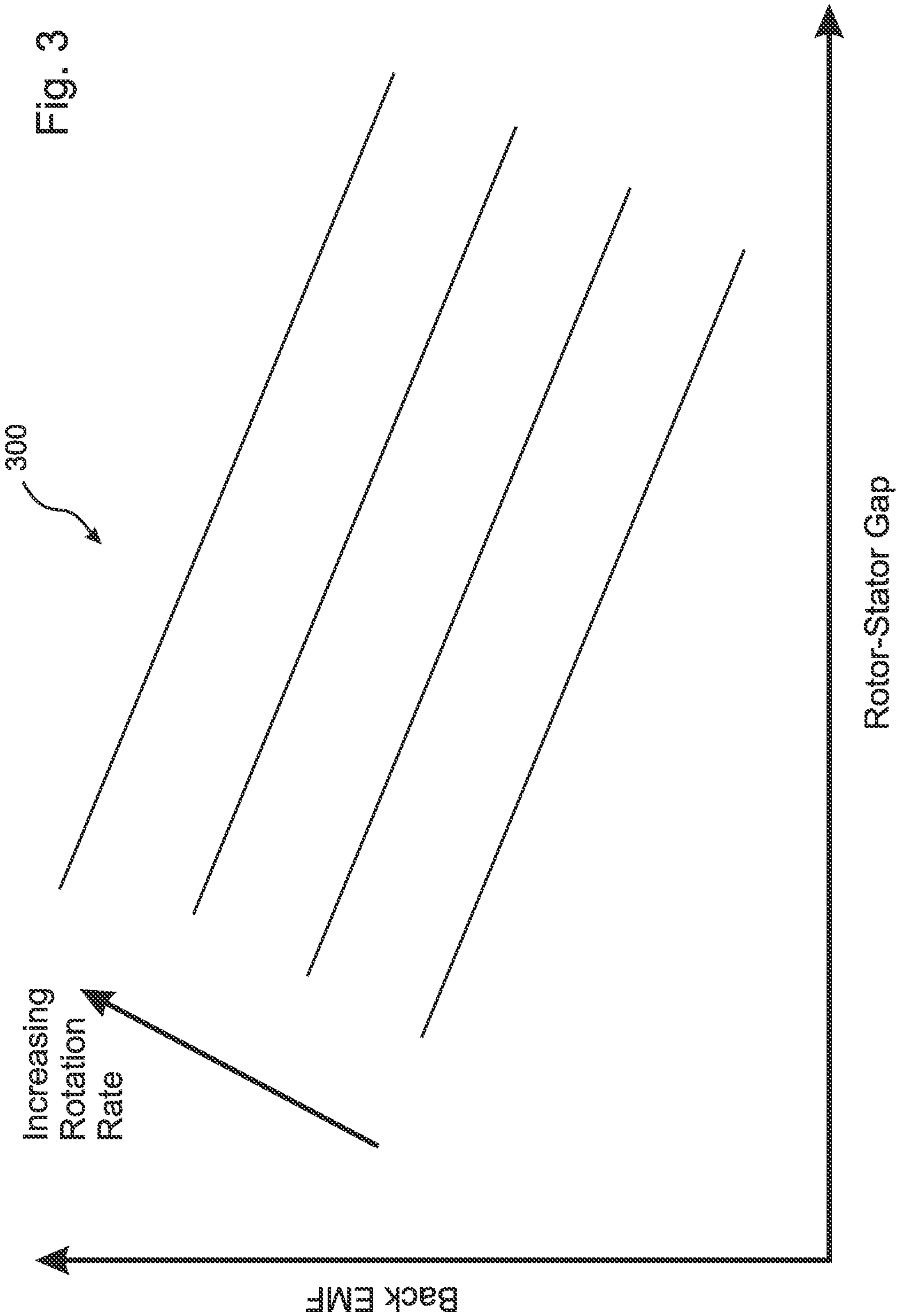
FIG. 3 is a graph that illustrates dependence of the back EMF on the rotation rate of the impeller and the size of the rotor-stator gap, according to the present invention.

Embodiments such as FIGS. 2A and 2B include only one thrust washer 220 that limits axial magnetic attraction of the impeller 202 to the stator coils 208. Thrust washer 220 can therefore be regarded as the “magnetic” thrust washer 220, because it opposes the magnetic axial thrust. Such embodiments would typically be employed for applications where this magnetic attraction of the impeller 202 to the stator coils 208 is expected to be always greater than the hydraulic thrust of the impeller 202. In these embodiments, the rotor-stator gap 226 is expected to steadily grow smaller, causing the back EMF to grow steadily larger, as indicated in FIG. 3.

Figure 2C:
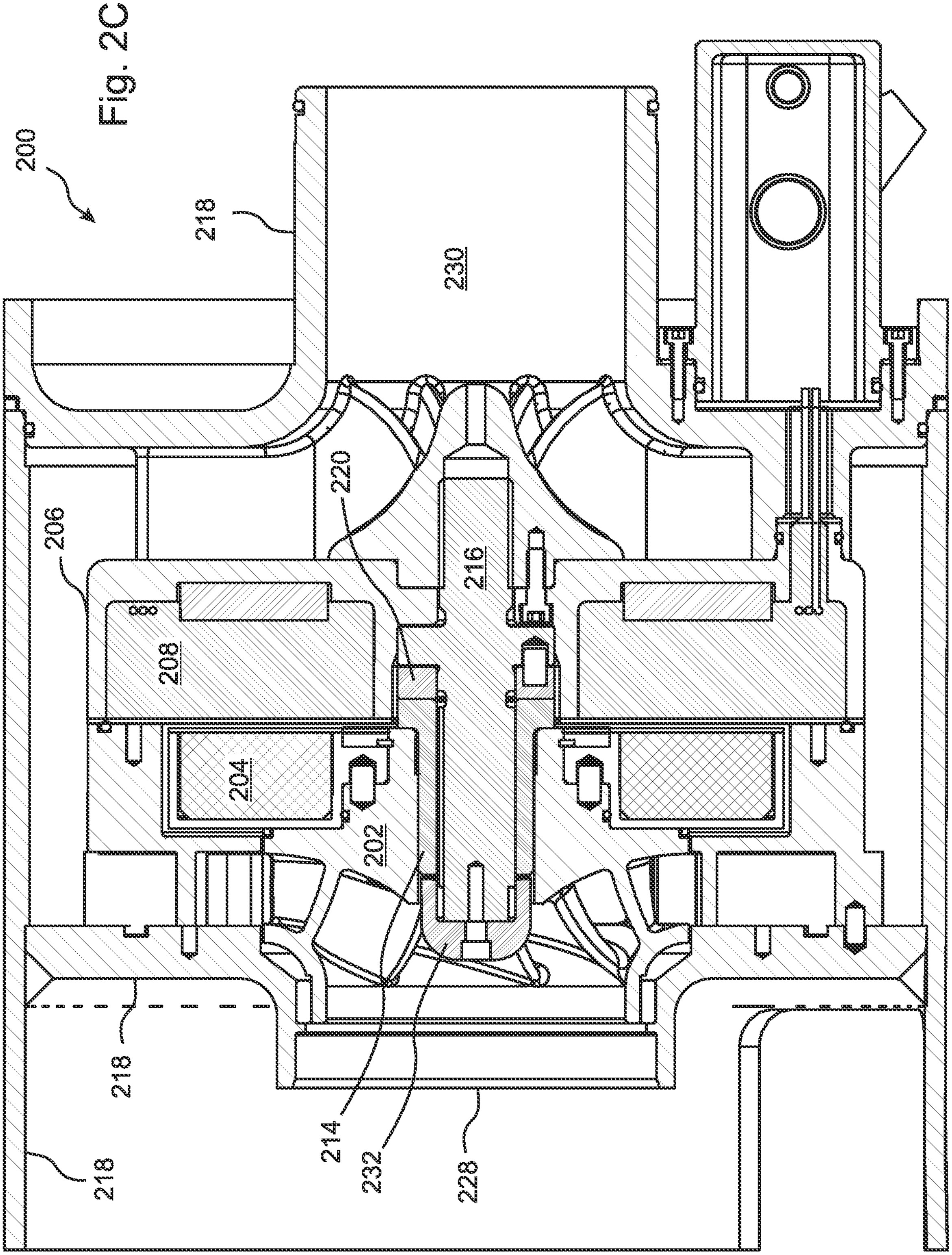
FIG. 2C is a sectional view, drawn to scale, of an embodiment that is similar to FIG. 2A but includes a hydraulic thrust washer in addition to the magnetic thrust washer.
Figure 2D:
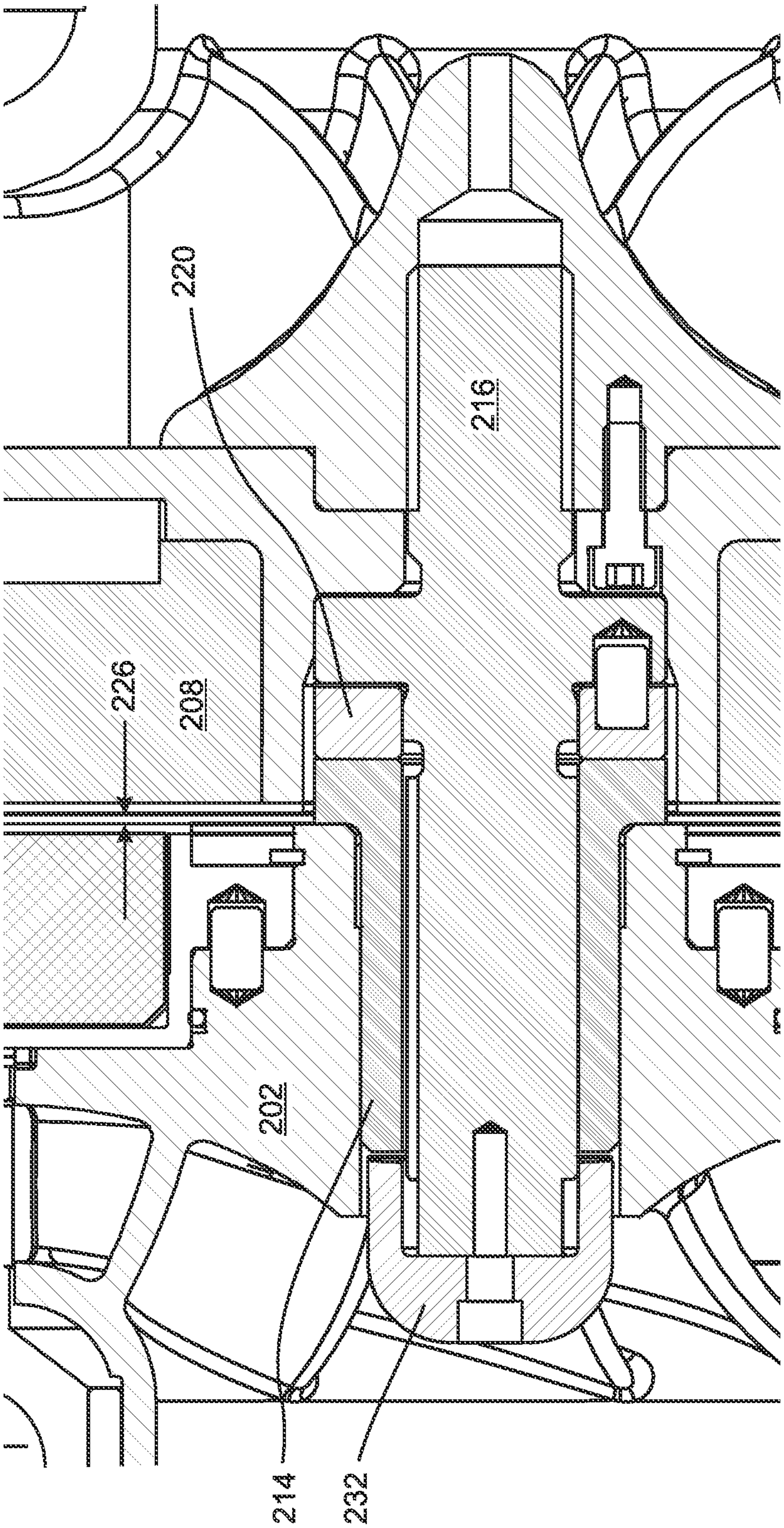
FIG. 2D is an enlarged sectional view, drawn to scale, of a portion of FIG. 2C.

With reference to FIGS. 2C and 2D, in other embodiments where the speed of the impeller 202 is expected to be very high during some phases of IMP operation, a second “hydraulic” thrust washer 232 is provided that limits the rotor-stator gap 226 from becoming too large when the hydraulic axial thrust of the impeller 202 exceeds the magnetic attraction of the impeller 202 to the stator coils 208. In these embodiments, the controller 212 detects the transitions of the rotor-stator gap 226 between minimum and maximum values, which are limited by the magnetic thrust washer 220 and the hydraulic thrust washer 232 respectively, and thereby monitors the separate wear status of both thrust washers 220, 232 according to the detected changes in back EMF versus impeller speed.

Figure 4:
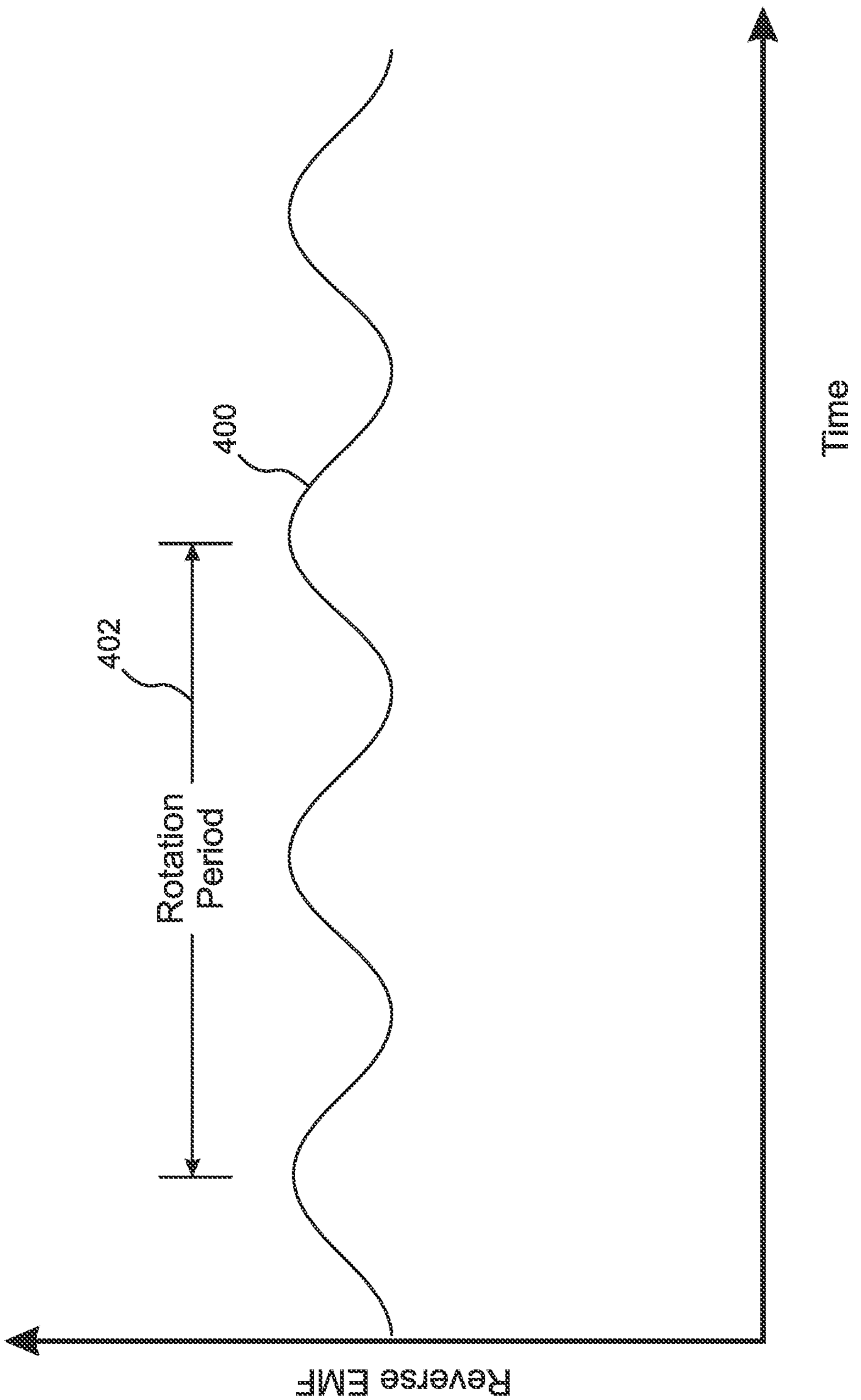
FIG. 4 is a graph that illustrates determining the impeller rotation rate from a modulation frequency of a measured back EMF in an IMT embodiment of the present invention.

In IMP embodiments, because the induction coils or permanent magnets and stator coils function as a synchronous motor, the rotation rate of the rotor is known from the line frequency of the power source 210, or from the impulse frequency of the power source output if the power source 210 is a VFD. In IMT embodiments, with reference to FIG. 4, the rotation rate of the rotor can be determined based on the periodic amplitude modulation of the output voltage 400 of the generator. In the illustrated example, as a simple example, the IMT includes only two permanent magnets 204 and two stator coils 208, so that the period of rotation 402 of the rotor is equal to twice the period between amplitude modulations of the output voltage 400. In embodiments, the IMT includes more than two permanent magnets 204 and corresponding stator coils 208, so that a larger number of amplitude modulations are included within a single rotation period 402.

In some IMP embodiments, the back EMF is indirectly determined by monitoring the voltage and current that are applied by the power source 210 to the stator coils 208. This approach takes advantage of the fact that the back EMF reduces the net voltage that is applied to the stator coils 208 which causes the current in the stator coils 208 to be reduced. The back EMF thereby increases an effective complex impedance or “phase inductance” of the stator coils 208, which can be monitored as a change in the current to voltage ratio of the output of the power source 210.

Figure 5:
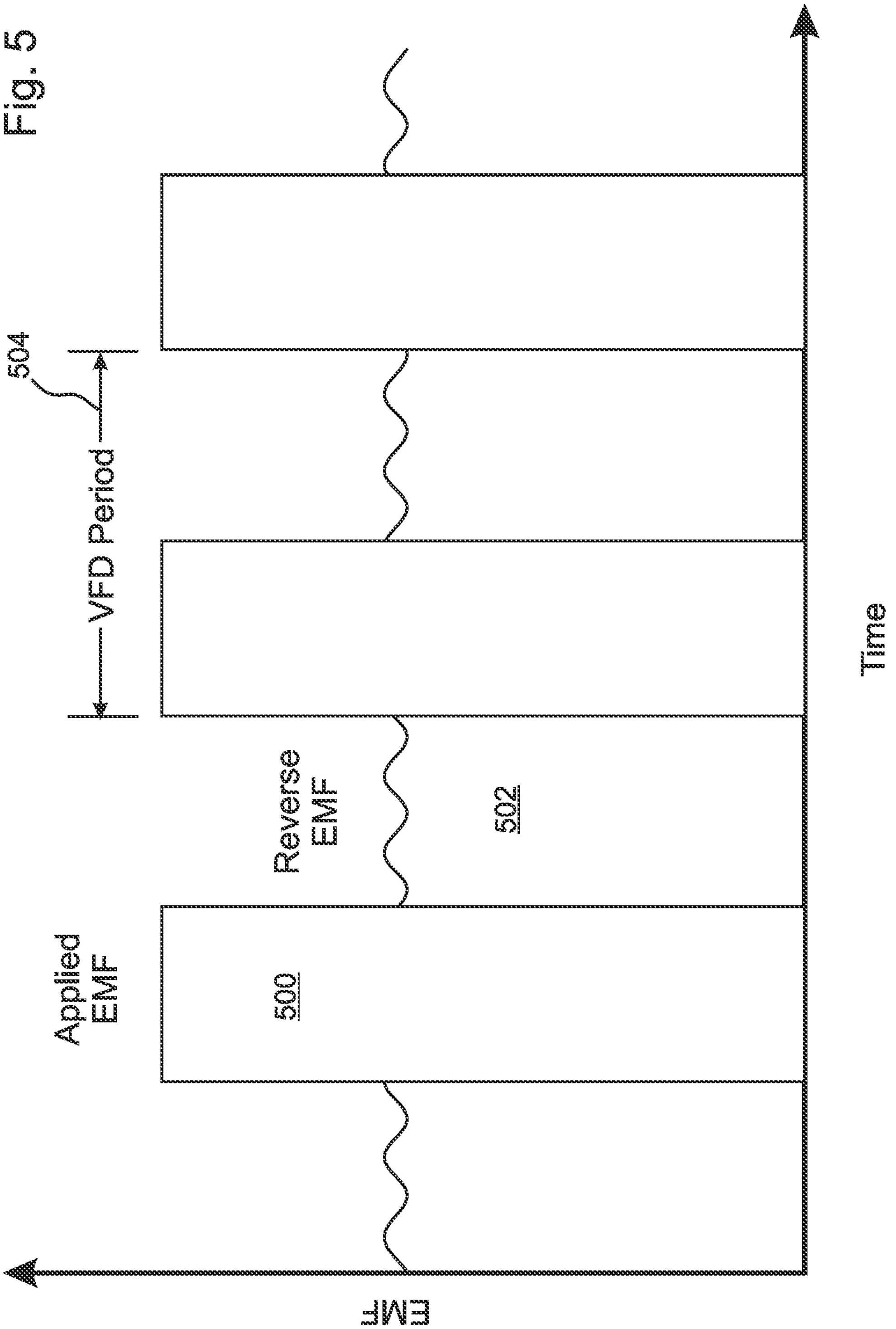
FIG. 5 is a graph that illustrates direct measurement of the back EMF between variable frequency drive EMF output bursts in an IMP embodiment of the present invention.

With reference to FIG. 5, in various IMP embodiments where the power source 210 is a source of intermittent or pulsed power, such as a variable frequency drive (VFD) that emits electrical impulses 500 according to a variable period 504, the back EMF 502 is directly measured by the controller 212 during the intervals between the electrical impulses 500 as a voltage that is generated within the stator coils 206 by the permanent magnets 204. In IMT embodiments, the output of the generator is the “back” EMF, and is directly monitored.

In embodiments, the functional relationship, as illustrated by FIG. 3, between the back EMF and the axial rotor-stator gap 226 is determined based on calibration measurements, which can include data collected during normal IMP or IMT operation, component testing, and/or measurements of the stator EMF during “free” rotation of the impeller 202, i.e. rotation of the impeller 202 that is externally driven while the stator is unloaded by the power source 210 or power load.

In embodiments, the disclosed method of monitoring axial bearing wear therefore does not require addition of any sensors to the IMP or IMT, but instead depends entirely on external measurements of voltages and/or currents, in combination with a knowledge of the impeller rotation rate. In various embodiments, it is only necessary to modify the configuration of the controller 212, so that it that will determine the rotation rate of the rotor and the back EMF, calculate the implied axial rotor-stator gap 226, and take further actions as needed.

In embodiments, the controller 212 reports the estimated magnitude of the axial rotor-stator gap 226 to a user as a visual indication and/or a log entry that can be periodically reviewed as needed, and/or transmits the estimate magnitude of the axial rotor-stator gap 226 to a device that is accessible to the user. In some embodiments, the controller 212 is configured to issue an alarm if extreme wear is detected, such as issuing an audible alert or highly visible indication, and/or transmitting a message to a user by email and/or text (SMS) message. In various embodiments, the controller 212 is configured to automatically halt the operation of the IMP or IMT module if the estimated magnitude of the axial rotor-stator gap 226 falls outside of a specified range. For example, the controller 212 can cause the power source 210 to cease applying power to the stator coils in an IMP embodiment, or the controller 212 can cause an inlet valve to close and stop a flow of fluid that is causing the impeller 202 of an IMT embodiment to rotate.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. A bearing wear monitoring system for an integral motor pump (IMP) or integral motor turbine (IMT), the system comprising:

a module including:

a module housing configured to enable a fluid to pass from an input of the module housing to an output of the module housing;

a stator housing fixed within the module housing;

a shaft extending axially from the stator housing;

an impeller;

a bearing fixed to the impeller so as to enable the impeller to rotate about the shaft;

a plurality of induction coils or permanent magnets fixed to the impeller so as to pass in proximity to the stator housing when the impeller rotates about the shaft;

a plurality of stator coils fixed within the stator housing so as to be proximate the plurality of induction coils or permanent magnets as the plurality of induction coils or permanent magnets passes in proximity to the stator housing, the plurality of induction coils or permanent magnets and the plurality of stator coils facing each other so as to define an axial rotor-stator gap as the plurality of induction coils or permanent magnets passes in proximity to the plurality of stator coils;

a magnetic thrust limiter fixed to the stator housing so as to resist an axial magnetic thrust of the plurality of induction coils or permanent magnets toward the plurality of stator coils by applying an opposing mechanical force to the bearing, the magnetic thrust limiter thereby maintaining the rotor-stator gap when the magnetic thrust is greater than an axial hydraulic thrust of the impeller; and a power source or power load electrically cooperative with the plurality of stator coils; and a controller configured to:

determine a magnitude of a back electro-motive force (EMF) generated as the plurality of induction coils or permanent magnets passes in proximity to the plurality of stator coils;

determine a rotation rate of the impeller;

estimate a magnitude of the rotor-stator gap based on the rotation rate of the impeller and the magnitude of the back EMF;

estimate a wear status of the magnetic thrust limiter based on the estimated magnitude of the rotor-stator gap when the magnetic thrust is greater than the hydraulic thrust; and at least one of:

communicate the estimated magnitude of the rotor-stator gap to a user; and cause the module to cease operation when the estimated magnitude of the rotor-stator gap falls below a specified threshold.

2. The system of claim 1, wherein the shaft is fixed to the stator housing.

3. The system of claim 1, wherein the magnetic thrust limiter resists the axial magnetic thrust by contacting the bearing.

4. The system of claim 1, wherein the determining of the magnitude of the back EMF includes directly measuring the back EMF.

5. The system of claim 4, wherein:

the module is an IMP module including the power source;

the power source is a variable frequency drive (VFD); and the back EMF is directly measured during intervals between power impulses emitted by the VFD.

6. The system of claim 1, wherein:

the module is an IMP module including the power source; and the determining of the magnitude of the back EMF includes calculating the back EMF based on a voltage applied to the plurality of stator coils by the power source and a current flowing through the plurality of stator coils.

7. The system of claim 1, wherein:

the module is an IMT module including the power load; and the determining of the rotation rate of the impeller includes directly measuring the back EMF and determining a periodicity of an amplitude modulation of the back EMF.

8. The system of claim 1, wherein:

the module is an IMP module including the power source;

the rotation of the impeller is synchronous with an amplitude modulation of a voltage applied to the plurality of stator coils by the power source; and the determining of the rotation rate of the impeller includes deducing the rotation rate based on a modulation frequency of the amplitude modulation.

9. The system of claim 1, wherein the module further includes a hydraulic thrust limiter fixed to the shaft so as to resist the hydraulic thrust of the impeller by applying an opposing mechanical force to the bearing, the hydraulic thrust limiter thereby maintaining the rotor-stator gap when the hydraulic thrust is greater than the magnetic thrust.

10. The system of claim 9, wherein the controller is further configured to:

estimate, based on the rotation rate of the impeller and the magnitude of the back EMF, a minimum magnitude of the rotor-stator gap when the magnetic thrust is greater than the hydraulic thrust, and a maximum magnitude of the rotor-stator gap when the hydraulic thrust is greater than the magnetic thrust;

estimate the wear status of the magnetic thrust limiter based on the estimated magnitude of the rotor-stator gap when the magnetic thrust is greater than the hydraulic thrust; and estimate a wear status of the hydraulic thrust limiter based on the estimated magnitude of the rotor-stator gap when the hydraulic thrust is greater than the magnetic thrust.

11. The system of claim 1, wherein the controller is further configured to cause the module to cease operation when the estimated magnitude of the rotor-stator gap falls below the specified threshold.

12. A method of monitoring bearing wear of an integral motor pump (IMP) or integral motor turbine (IMT), the method comprising:

providing a module including:

a module housing configured to enable a fluid to pass from an input of the module housing to an output of the module housing;

a stator housing fixed within the module housing;

a shaft extending axially from the stator housing;

an impeller;

a bearing fixed to the impeller so as to enable the impeller to rotate about the shaft;

a plurality of induction coils or permanent magnets fixed to the impeller so as to pass in proximity to the stator housing when the impeller rotates about the shaft;

a plurality of stator coils fixed within the stator housing so as to be proximate the plurality of induction coils or permanent magnets as the plurality of induction coils or permanent magnets passes in proximity to the stator housing, the plurality of induction coils or permanent magnets and the plurality of stator coils facing each other so as to define an axial rotor-stator gap as the plurality of induction coils or permanent magnets passes in proximity to the plurality of stator coils; and a magnetic thrust limiter fixed to the stator housing so as to resist an axial magnetic thrust of the impeller by applying an opposing force to the bearing, the magnetic thrust limiter thereby maintaining the rotor-stator gap when the magnetic thrust is greater than an axial hydraulic thrust of the impeller;

determining a magnitude of a back electro-motive force (EMF) generated as the plurality of induction coils or permanent magnets passes in proximity to the plurality of stator coils;

determining a rotation rate of the impeller;

estimating a magnitude of the rotor-stator gap based on the rotation rate of the impeller and the magnitude of the back EMF;

estimating a wear status of the magnetic thrust limiter based on the estimated magnitude of the rotor-stator gap when the magnetic thrust is greater than the hydraulic thrust; and at least one of:

communicating the estimated magnitude of the rotor-stator gap to a user; and causing the module to cease operation when the estimated magnitude of the rotor-stator gap falls below a specified threshold.

13. The method of claim 12, wherein the determining of the magnitude of the back EMF includes directly measuring the back EMF.

14. The method of claim 13, wherein:

the module is an IMP module which further includes a power source configured as a variable frequency drive (VFD); and the determining of the magnitude of the back EMF includes directly measuring the magnitude of the back EMF during intervals between power impulses emitted by the VFD.

15. The method of claim 12, wherein:

the module is an IMP module; and the determining of the magnitude of the back EMF includes calculating the back EMF based on a voltage applied to the plurality of stator coils and a current flowing through the plurality of stator coils.

16. The method of claim 12, wherein:

the module is an IMT module; and the determining of the rotation rate of the impeller includes directly measuring the back EMF and determining a periodicity of an amplitude modulation of the back EMF.

17. The method of claim 12, wherein:

the module is an IMP module;

the rotation of the impeller is synchronous with an amplitude modulation of a voltage applied to the plurality of stator coils; and the determining of the rotation rate of the impeller includes deducing the rotation rate based on a modulation frequency of the amplitude modulation.

18. The method of claim 12, wherein:

the module further includes a hydraulic thrust limiter fixed to the shaft so as to resist the hydraulic thrust of the impeller by applying an opposing mechanical force to the bearing, the hydraulic thrust limiter thereby maintaining the rotor-stator gap when the hydraulic thrust is greater than the magnetic thrust; and the method further comprises:

estimating the magnitude of the rotor-stator gap based on the rotation rate of the impeller and the magnitude of the back EMF when the hydraulic thrust is greater than the magnetic thrust; and estimating a wear status of the hydraulic thrust limiter based on the estimated magnitude of the rotor-stator gap when the hydraulic thrust is greater than the magnetic thrust.

19. The method of claim 12, wherein the communicating of the estimated magnitude of the rotor-stator gap to the user includes at least one of:

visually displaying the estimated magnitude of the rotor-stator gap;

transmitting the estimated magnitude of the rotor-stator gap to a device that is accessible to the user; and recording the estimated magnitude of the rotor-stator gap on non-transient media that is accessible to the user.

20. The method of claim 12, wherein the method includes the causing of the module to cease operation when the estimated magnitude of the rotor-stator gap falls below the specified threshold.

* * * * *